(12) United States Patent
Awatsu

(10) Patent No.: US 11,283,741 B2
(45) Date of Patent: Mar. 22, 2022

(54) CONTROL DEVICE AND NON-TRANSITORY COMPUTER READABLE MEDIUM

(71) Applicant: FUJIFILM BUSINESS INNOVATION CORP., Tokyo (JP)

(72) Inventor: Yusaku Awatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 158 days.

(21) Appl. No.: 16/528,935

(22) Filed: Aug. 1, 2019

(65) Prior Publication Data

US 2020/0213257 A1 Jul. 2, 2020

(30) Foreign Application Priority Data

Dec. 28, 2018 (JP) .............................. JP2018-247840

(51) Int. Cl.
| | | |
|---|---|---|
| *G06T 3/40* | (2006.01) | |
| *H04N 1/32* | (2006.01) | |
| *H04L 12/18* | (2006.01) | |
| *H04L 12/58* | (2006.01) | |
| *G06F 3/14* | (2006.01) | |

(Continued)

(52) U.S. Cl.
CPC ............ *H04L 51/08* (2013.01); *G06F 3/1454* (2013.01); *G06T 3/4092* (2013.01); *H04N 1/32144* (2013.01); *H04L 12/1813* (2013.01); *H04L 51/02* (2013.01)

(58) Field of Classification Search
CPC ..... H04L 51/08; H04L 12/1813; H04L 51/02; H04L 51/32; H04L 51/046; H04L 51/10; H04L 51/18; H04L 2209/603; H04L 2209/608; H04L 2209/605; H04N 1/32144; H04N 1/32149; H04N 1/32325; H04N 2201/3233; H04N 2201/3246; G06F 3/1454; G06F 3/147; G06F 3/1222; G06F 3/1238; G06F 3/1253; G06F 3/1285; G06T 3/4092; G09G 2340/10; G09G 2340/12; G09G 2358/00; G09G 2340/14

See application file for complete search history.

(56) References Cited

U.S. PATENT DOCUMENTS

2003/0217118 A1* 11/2003 Kobayashi .......... G06F 16/9577
709/218
2005/0223322 A1* 10/2005 Graham ............. H04N 21/8456
715/255

(Continued)

FOREIGN PATENT DOCUMENTS

| | | |
|---|---|---|
| JP | 2016-062482 A | 4/2016 |
| JP | 2018-018477 A | 2/2018 |

*Primary Examiner* — Benjamin R Bruckart
*Assistant Examiner* — Tien M Nguyen
(74) *Attorney, Agent, or Firm* — Oliff PLC

(57) ABSTRACT

A control device includes a receiver, a generator, and a controller. The receiver receives a shared image to be shared with a user from a poster through a communication line. The generator generates a presented image, the presented image being an image that is to be presented to the user and that is obtained by processing the shared image such that the image is different from the shared image received by the receiver. The controller performs control to transmit the presented image to the poster through the communication line to notify the user of content of the shared image.

18 Claims, 12 Drawing Sheets

(51) Int. Cl.
*H04L 51/08* (2022.01)
*H04L 51/02* (2022.01)

(56) References Cited

U.S. PATENT DOCUMENTS

| | | | |
|---|---|---|---|
| 2009/0088188 A1* | 4/2009 | Wormald | H04W 4/18 455/466 |
| 2014/0074986 A1* | 3/2014 | Stoop | H04W 76/16 709/219 |
| 2014/0075335 A1* | 3/2014 | Hicks | G06Q 10/10 715/753 |
| 2015/0113441 A1* | 4/2015 | Felt | H04L 65/602 715/753 |
| 2015/0302541 A1* | 10/2015 | Yoshimura | H04N 1/32144 382/224 |
| 2016/0359957 A1* | 12/2016 | Laliberte | G06Q 30/0241 |

\* cited by examiner

FIG. 7

| IDENTIFICATION INFORMATION | SHARED IMAGE INFORMATION | PRESENTED IMAGE INFORMATION | EXPIRATION DATE | POSTER ID |
|---|---|---|---|---|
| 12345 | D:¥FileStorage¥001¥image1.jpg | D:¥FileStorage¥001¥image1R.jpg | 01/01/2019 | 001 |
| 12346 | D:¥FileStorage¥002¥image2.jpg | D:¥FileStorage¥002¥image2R.jpg | 01/17/2019 | 002 |
| ... | ... | ... | ... | ... |

| IDENTIFICATION INFORMATION | SHARED IMAGE INFORMATION | PRESENTED IMAGE INFORMATION | EXPIRATION DATE | POSTER ID | RELATED SHARED IMAGE |
|---|---|---|---|---|---|
| 12345 | D:\FileStorage\001\image1.jpg | D:\FileStorage\001\image1R.jpg | 01/01/2019 | 001 | 12347 |
| 12346 | D:\FileStorage\002\image2.jpg | D:\FileStorage\002\image2R.jpg | 01/17/2019 | 002 | — |
| 12347 | D:\FileStorage\001\image2.jpg | D:\FileStorage\001\image2R.jpg | 01/20/2019 | 001 | 12345 |
| ... | ... | ... | ... | ... | ... |

16

CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-247840 filed Dec. 28, 2018.

BACKGROUND

(i) Technical Field

The present disclosure relates to a control device and a non-transitory computer readable medium.

(ii) Related Art

Japanese Unexamined Patent Application Publication No. 2018-18477 discloses a system that is connected to the Internet and that generates and provides print data specific to a position. The system includes a unit that receives position confirmation information from a requesting terminal connected to the Internet and compares the position confirmation information with position determination information; a unit that obtains a registered material registered in a storage server from the terminal; a unit that obtains a position-specific material specific to the compared position; a unit that automatically lays out the registered material and the position-specific material and generates print data; and a unit that transmits the print data to a printing terminal.

Japanese Unexamined Patent Application Publication No. 2016-62482 discloses a program for causing a computer accessible to a memory to function as an obtaining unit that obtains posted data including at least a message posted to a social networking service and user identification information of a user who has posted the message; a registering unit that, if the posted data obtained by the obtaining unit includes image data, issues a processing identification number identifying the processing to be performed on the image data and registers the processing identification number and the image data in the memory in association with each other; and a posting unit that, after the registering unit issues the processing identification number, posts a processing identification notification message including the processing identification number to the social networking service so that the processing identification number is notified to at least the user who has posted the message.

SUMMARY

There have been increasing opportunities to download an image of a character or the like from a server and to print the image on a sheet or use the image in posting to a social networking service. Thus, an image creator may post an image created thereby to a social networking service or the like to notify a user of an image available for download.

However, cases have been seen in which an image posted by a creator is illicitly used by a user, and the user, who is not the creator of the image, makes a false insistence that the image has been created by the user.

Aspects of non-limiting embodiments of the present disclosure relate to a control device and a non-transitory computer readable medium that are capable of preventing an image to be shared from being illicitly used by a person without permission from a poster of the image, compared to a case where the poster uses the image to be shared as a notification image for notifying another user that there is the image to be shared through a communication line.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control device including a receiver, a generator, and a controller. The receiver receives a shared image to be shared with a user from a poster through a communication line. The generator generates a presented image, the presented image being an image that is to be presented to the user and that is obtained by processing the shared image such that the image is different from the shared image received by the receiver. The controller performs control to transmit the presented image to the poster through the communication line to notify the user of content of the shared image.

BRIEF DESCRIPTION OF THE DRAWINGS

An exemplary embodiment of the present disclosure will be described in detail based on the following figures, wherein:

FIG. 7 is a diagram illustrating an example of a registration table;

FIG. 16 is a diagram illustrating an example of a registration table including a related shared image column.

DETAILED DESCRIPTION

Figure 1:
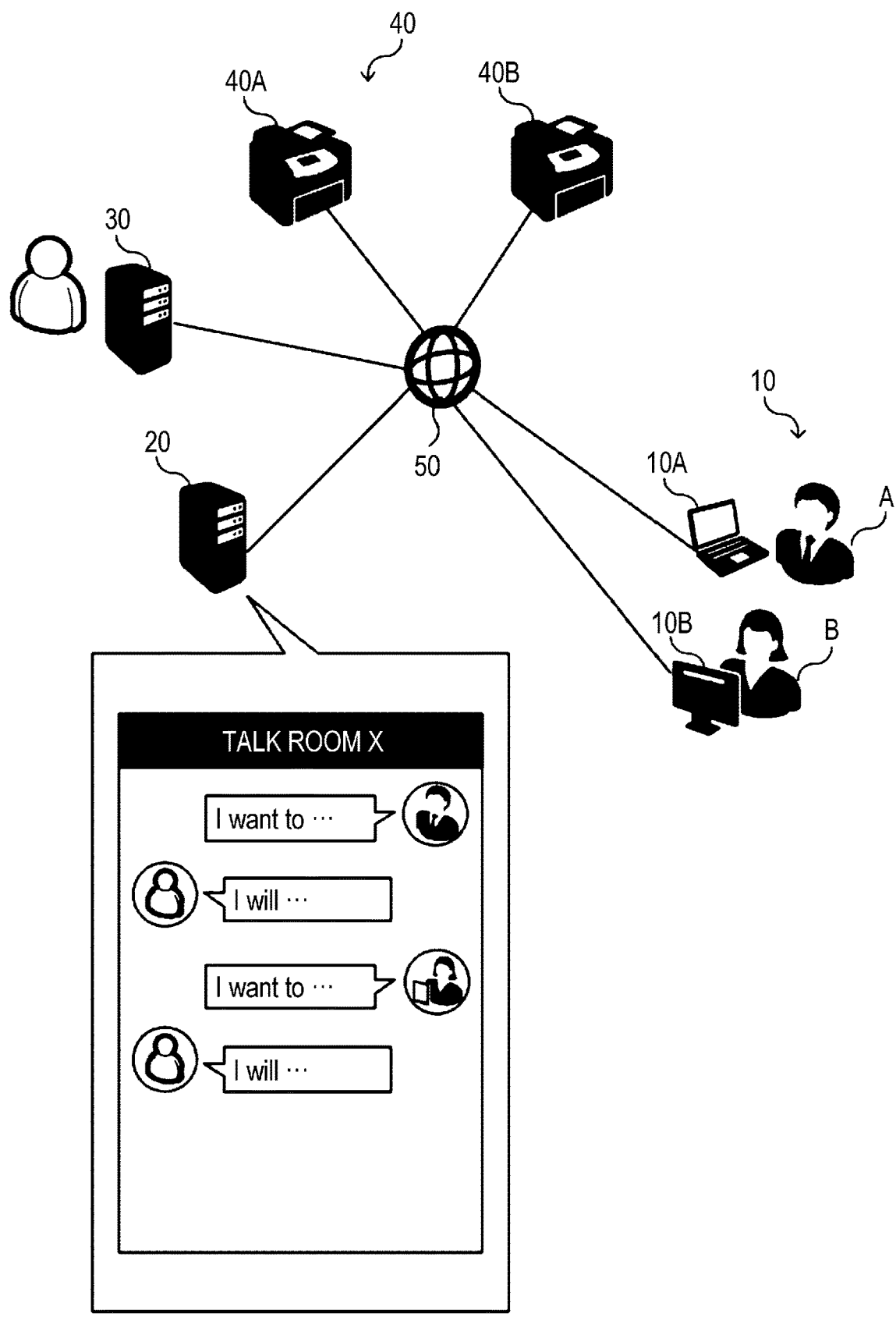
FIG. 1 is a diagram illustrating an example of a schematic configuration of a control system.

Hereinafter, a technique according to an exemplary embodiment of the present disclosure will be described with reference to the attached drawings. In each figure, components and steps of processing that are identical or equivalent to each other will be denoted by the same reference numerals, and a duplicate description will not be given. Note that the dimensional ratios in the figures are exaggerated for convenience of description and may be different from the actual ratios.

Exemplary Embodiment

FIG. 1 is a diagram illustrating an example of a schematic configuration of a control system related to a technique according to an exemplary embodiment of the present disclosure.

The control system includes a user terminal 10, a talk room server 20, a control device 30, and an information processing device 40. The user terminal 10, the talk room server 20, the control device 30, and the information processing device 40 are connected to each other through a communication line 50. The control device 30 operates as a chatbot server for a chat performed in a talk room, as will be described below.

The user terminal 10 is a terminal used by a user and may be any type of terminal, such as a desktop computer, a notebook personal computer, a tablet, or a smartphone. In FIG. 1, it is assumed that a user A uses a user terminal 10A and a user B uses a user terminal 10B. Hereinafter, the user terminals 10A and 10B will collectively be referred to as "user terminals 10". Although only two users, the users A and B, are illustrated in FIG. 1 for convenience of description, three or more users may exist and the user terminals 10 used by the individual users may be connected to the communication line 50.

The talk room server 20 provides a talk room. The talk room is a virtual space where at least one user and a chatbot, which will be described below, or plural users participate in a chat, and information represented by a file posted through the chat is sharable.

Here, a "file" is a unit of data representing some information, and a "chat" is to input and exchange information in real time by plural members over a computer network or is an environment for performing a chat. A "member" includes both a user associated with a real person and a software robot that operates in accordance with a specific rule. A "chatbot" is a software robot that performs control so that specific processing is performed on the basis of information posted by a user in the talk room.

It is possible for a user to post a file to the talk room through the user terminal 10. Here, "to post a file" is an act of inputting information in a chat. The user who posts a file is also referred to as a "poster".

Information represented by a file includes, for example, an image and text. Thus, "to post a file" is, in other words, an act of inputting various instructions or information represented by an image and text in a chat.

In the talk room, users are able to share information represented by a file, and a chatbot is able to respond to information from a user. In addition, in the talk room, a user is able to provide the chatbot with an instruction to cause the information processing device 40 to perform predetermined specific processing. The chatbot extracts the instruction included in information represented by a posted file through, for example, natural language processing. In a case where the type of information represented by the posted file is an image, the chatbot manages the posted image and performs control to cause the information processing device 40 to perform specific processing. A user and a chatbot in a one-to-one relationship, plural users and a chatbot, or plural users may participate in the talk room.

A chat performed by two users participating in the talk room is referred to as an "individual chat", and a chat performed by three or more users participating in the talk room is referred to as a "group chat". One of the users participating in a chat may be a chatbot. Plural talk rooms may exist in accordance with the number of talk rooms that have been opened.

The control device 30 controls the chatbot and manages a file posted from the user terminal 10 to the talk room. When receiving a user request from the information processing device 40, the control device 30 performs control to perform specific processing in cooperation with the information processing device 40 so that the specific processing is performed on the managed file. The chatbot participates in the talk room and responds to information represented by a file posted by a poster, as described above.

The type of information represented by the file posted by the poster is not limited. Here, an example will be given where the poster posts an image to be shared with other users. "To share an image" is to make a state where each of the other users is able to obtain the image. The "other users" are users participating in the talk room other than the poster of the image.

To share an image with other users, the poster who has an image to be shared (hereinafter referred to as a "shared image 12") performs an individual chat with the chatbot in the talk room, and posts the shared image 12 to the talk room, thereby registering the shared image 12 in the control device 30. After the shared image 12 is registered in the control device 30, the control device 30 transmits, to the poster of the shared image 12, an image for notifying the other users of the content of the registered shared image 12 (hereinafter referred to as a "presented image 14") and identification information associated with the registered shared image 12 in a one-to-one relationship.

The poster of the shared image 12 receives the presented image 14 and the identification information, and posts the presented image 14 and the identification information to the talk room through an individual chat or group chat in which the other users participate, thereby sharing the shared image 12 with the other users.

The information processing device 40 is a device that performs information processing in cooperation with the control device 30 in response to a user instruction. "Information processing" includes, for example, processing of performing printing by using text data, image data, or the like; processing of generating or processing data by using a function equipped in the information processing device 40; processing of transmitting and receiving data between the information processing device 40 and another device; and the like.

Hereinafter, a description will be given of an example in which the information processing device 40 is an image forming device and the specific processing performed by the information processing device 40 is processing of forming the shared image 12 on a recording medium, such as a sheet. However, the specific processing is not necessarily limited to forming of the shared image 12. For example, the specific processing may be processing of causing a character represented by the shared image 12 to appear as a character in a game.

The processing of forming some information, such as the shared image 12, on a recording medium and allowing a user to visually or tactually recognize the details of the information is referred to as "printing". The image forming device is an example of the information processing device 40, and thus the image forming device will be denoted by reference numeral 40 in the following description.

In the example of the control system illustrated in FIG. 1, an image forming device 40A and an image forming device 40B are connected to the communication line 50. Unless otherwise specified, the image forming device 40A and the image forming device 40B will be collectively referred to as "image forming devices 40". In the example illustrated in FIG. 1, the image forming devices 40 are connected to the control device 30 through the communication line 50. Alternatively, the image forming devices 40 may be connected to the control device 30 through a communication line that is different from the communication line 50 and is not illustrated. Alternatively, three or more image forming devices 40 may be connected to the communication line 50. The installation places of the image forming devices 40 are not limited. For example, the image forming devices 40 are installed in a place that anyone can visit, for example, a store such as a convenience store.

A user different from the poster of the shared image 12 inputs the identification information of the shared image 12 associated with the presented image 14 to any one of the image forming devices 40, thereby obtaining the shared image 12 printed on a recording medium.

Next, hardware configurations of the talk room server 20 and the control device 30 will be described.

Figure 2:
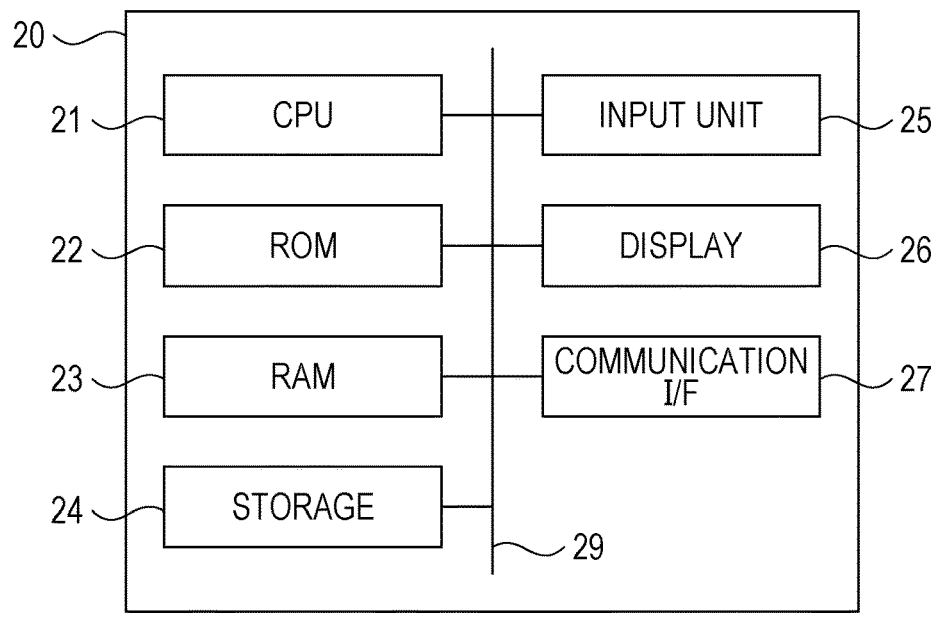
FIG. 2 is a block diagram illustrating an example of a hardware configuration of a talk room server.

FIG. 2 is a block diagram illustrating an example of a hardware configuration of the talk room server 20.

As illustrated in FIG. 2, the talk room server 20 includes a central processing unit (CPU) 21, a read only memory (ROM) 22, a random access memory (RAM) 23, a storage 24, an input unit 25, a display 26, and a communication interface (I/F) 27. These components are connected to each other through a bus 29 so as to be capable of communicating with each other.

The CPU 21 is a central arithmetic processing unit and functions as a control unit that executes various programs and controls the individual units. That is, the CPU 21 reads out a program from the ROM 22 or the storage 24 and executes the program by using the RAM 23 as a working area. The CPU 21 controls the above-described individual components and performs various arithmetic processing operations in accordance with the program recorded on the ROM 22 or the storage 24. In this exemplary embodiment, it is assumed that a talk room provision program for providing a talk room is stored in the ROM 22.

The ROM 22 stores various programs and various data. The RAM 23 serves as a working area and temporarily stores a program or data. The storage 24 is constituted by a hard disk drive (HDD) or a solid state drive (SSD) and stores various programs including an operating system and various data.

The input unit 25 includes a pointing device, such as a mouse, and a keyboard, and is used to perform various input operations.

The display 26 includes a display device that displays various pieces of information, such as a liquid crystal display or an organic electroluminescence (EL) display, and displays information processed by the CPU 21. The display 26 may function as the input unit 25 by adopting a touch screen system.

The communication I/F 27 is an interface for communicating with another device through the communication line 50 and uses a standard, for example, Ethernet (registered trademark), FDDI, Wi-Fi (registered trademark), Bluetooth (registered trademark), or the like.

Figure 3:
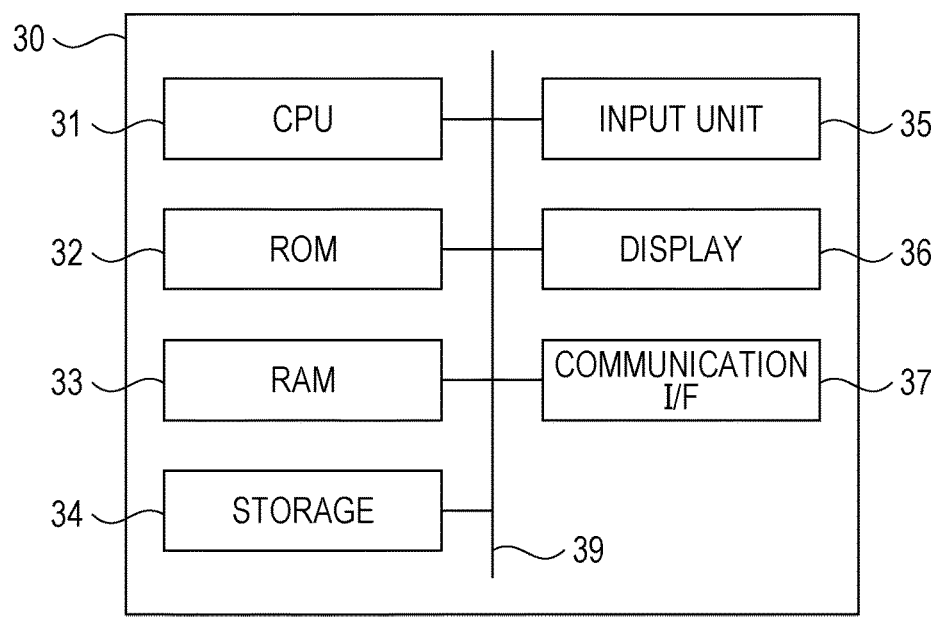
FIG. 3 is a block diagram illustrating an example of a hardware configuration of a control device.

FIG. 3 is a block diagram illustrating an example of a hardware configuration of the control device 30.

As illustrated in FIG. 3, the control device 30 includes a CPU 31, a ROM 32, a RAM 33, a storage 34, an input unit 35, a display 36, and a communication I/F 37. These components are connected to each other through a bus 39 so as to be capable of communicating with each other. The individual components of the control device 30 have functions similar to the components of the talk room server 20 illustrated in FIG. 2.

Next, functional configurations of the talk room server 20 and the control device 30 will be described.

Figure 4:
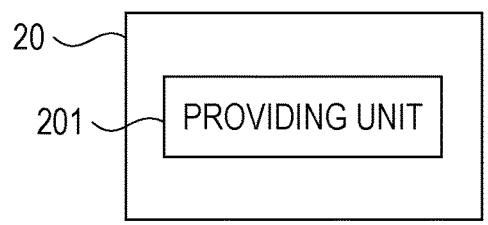
FIG. 4 is a block diagram illustrating an example of a functional configuration of the talk room server.

FIG. 4 is a block diagram illustrating an example of a functional configuration of the talk room server 20.

As illustrated in FIG. 4, the talk room server 20 includes a providing unit 201 as a functional component. The functional component is implemented when the CPU 21 reads out the talk room provision program stored in the ROM 22, loads the program into the RAM 23, and executes the program.

The providing unit 201 provides a talk room in which a user is able to participate and to which a user is able to post a file. With use of the function of the providing unit 201, the talk room server 20 provides a talk room in which an individual chat is performed and a talk room in which a group chat is performed.

Plural talk rooms may be opened in response to open requests from users. For example, in a case where a user accesses the talk room server 20 to make a request to open a talk room and opens a specific talk room, the user who has opened the talk room is able to invite another user to the opened talk room and allow the other user to participate in the talk room. A user participating in the talk room is able to invite another user not participating in the talk room to the talk room and allow the other user to participate in the talk room.

Figure 5:
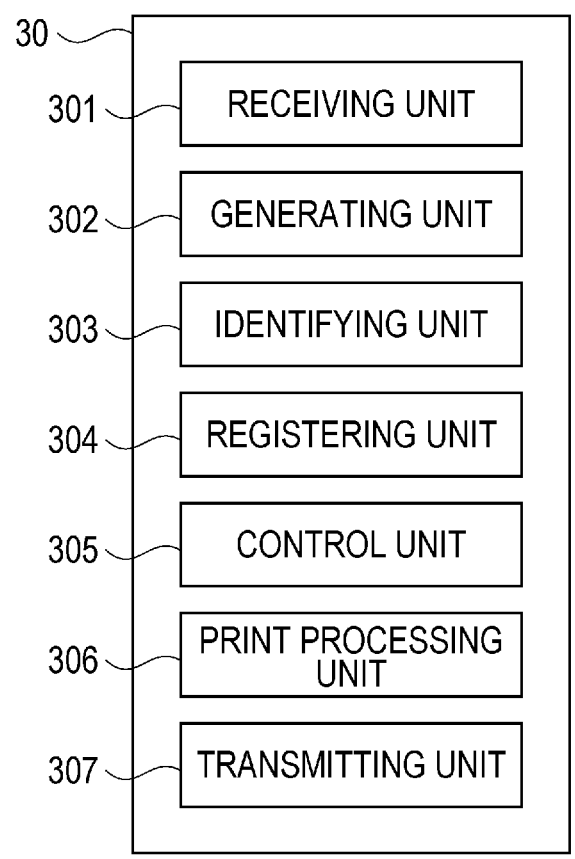
FIG. 5 is a block diagram illustrating an example of a functional configuration of the control device.

FIG. 5 is a block diagram illustrating an example of a functional configuration of the control device 30. As illustrated in FIG. 5, the control device 30 includes a receiving unit 301, a generating unit 302, an identifying unit 303, a registering unit 304, a control unit 305, a print processing unit 306, and a transmitting unit 307 as functional components. The individual functional components are implemented when the CPU 31 reads a control program stored in the ROM 32, loads the program into the RAM 33, and executes the program.

The receiving unit 301 receives various pieces of information from the user terminal 10, the talk room server 20, and the image forming device 40 that are connected to the communication line 50 through the communication I/F 37. The information received by the receiving unit 301 includes, for example, the shared image 12 that is transmitted from the user terminal 10 via the talk room server 20 and that is posted to a talk room by a poster. The information received by the receiving unit 301 also includes, for example, identification information that is associated with the shared image 12 and that is transmitted from the image forming device 40.

Figure 6:
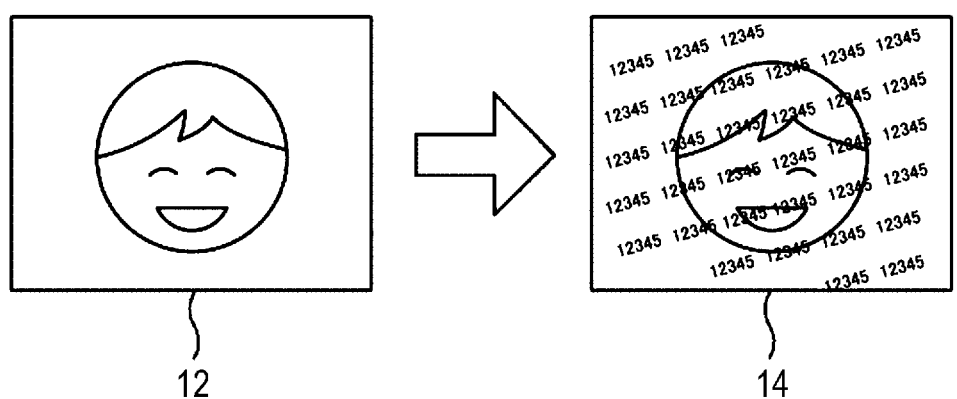
FIG. 6 is a diagram illustrating an example of a presented image generated from a shared image.

The generating unit 302 generates the presented image 14 by processing the shared image 12 received by the receiving unit 301 such that the presented image 14 is different from the shared image 12. FIG. 6 is a diagram illustrating an example of the presented image 14 generated from the shared image 12. The presented image 14 illustrated in FIG. 6 is generated by superimposing numerals on the shared image 12.

The generating unit 302 may generate the presented image 14 in accordance with displayed content of the shared image 12, depending on the type of processing setting designating the processing details of the shared image 12. Thus, the identifying unit 303 receives a request from the generating unit 302, identifies what is included in the shared image 12 by using an existing image recognition method, and notifies the generating unit 302 of an identification result. The generating unit 302 receives the identification result about the shared image 12 from the identifying unit 303 and generates, in accordance with the identification result, the presented image 14 in accordance with the displayed content of the shared image 12.

The generating unit 302 also generates identification information for the received shared image 12. The identification information may be expressed in any manner as long as the identification information is uniquely associated with the shared image 12. For example, numerals, letters, symbols, figures, images, or a combination thereof may be used. Here, a description will be given of, as an example, a case where the identification information is expressed by numerals.

The registering unit 304 registers, in a registration table 16, the shared image 12 received by the receiving unit 301, the presented image 14 generated from the shared image 12 by the generating unit 302, and the identification information of the shared image 12 in association with each other. To store the shared image 12, the presented image 14, and the identification information of the shared image 12 in a storage device for the purpose of providing the shared image 12 to other users is referred to as "register".

FIG. 7 is a diagram illustrating an example of the registration table 16. As illustrated in FIG. 7, the registration table 16 includes, for example, identification information, shared image information, presented image information, expiration date, and poster identification (ID).

The shared image information includes the file name of the shared image 12 and information about the folder in which the shared image 12 is stored. The presented image information includes the file name of the presented image 14 and information about the folder in which the presented image 14 is stored.

The expiration date indicates the deadline until which the shared image 12 is to be shared with other users. The expiration date may be uniformly set by the control device 30, for example, "30 days after receiving the shared image 12", or may be set in accordance with the expiration date designated by the poster of the shared image 12 when posting the shared image 12 to the talk room. In a case where no expiration date is set to the shared image 12, the shared image 12 is valid while the shared image 12 is registered in the control device 30.

The poster ID is information uniquely indicating who has posted the shared image 12 to the talk room.

The information included in the registration table 16 is not limited to the identification information, the shared image information, the presented image information, the expiration date, and the poster ID, and may also include other information in accordance with the type of specific processing.

In the example shown in the second row of the registration table 16 illustrated in FIG. 7, it is indicated that the file name of the shared image 12 is "image1.jpg", the file name of the presented image 14 is "image1R.jpg", and the storage location of the shared image 12 and the presented image 14 is "D:¥FileStorage¥001". It is also indicated that the identification number of the shared image 12 is "12345", the expiration date of the shared image 12 is Jan. 1, 2019, and the poster ID of the poster of the shared image 12 is "001". For convenience of description, it is assumed that the shared image 12, the presented image 14, the identification information of the shared image 12, and the registration table 16 are stored in the storage 34. However, the images, information, and so forth may be stored in an external device different from the control device 30 through the communication I/F 37.

The control unit 305 controls the receiving unit 301, the generating unit 302, the identifying unit 303, the registering unit 304, the print processing unit 306, which will be described below, and the transmitting unit 307, which will be described below, in accordance with the operation defined by the control program, and implements the functions requested to the control device 30.

The print processing unit 306 performs processing in response to a request from another user so that printing of the shared image 12, which is an example of specific processing for the shared image 12, is performed by the image forming device 40 designated by the other user.

The transmitting unit 307 transmits information used to share the shared image 12, such as the presented image 14 and the identification information, to the user terminal 10 that is used by the poster of the shared image 12, and also transmits information used to print the shared image 12, such as the identification information, to the image forming device 40 that is used by another user who has requested to print the shared image 12.

Figure 8:
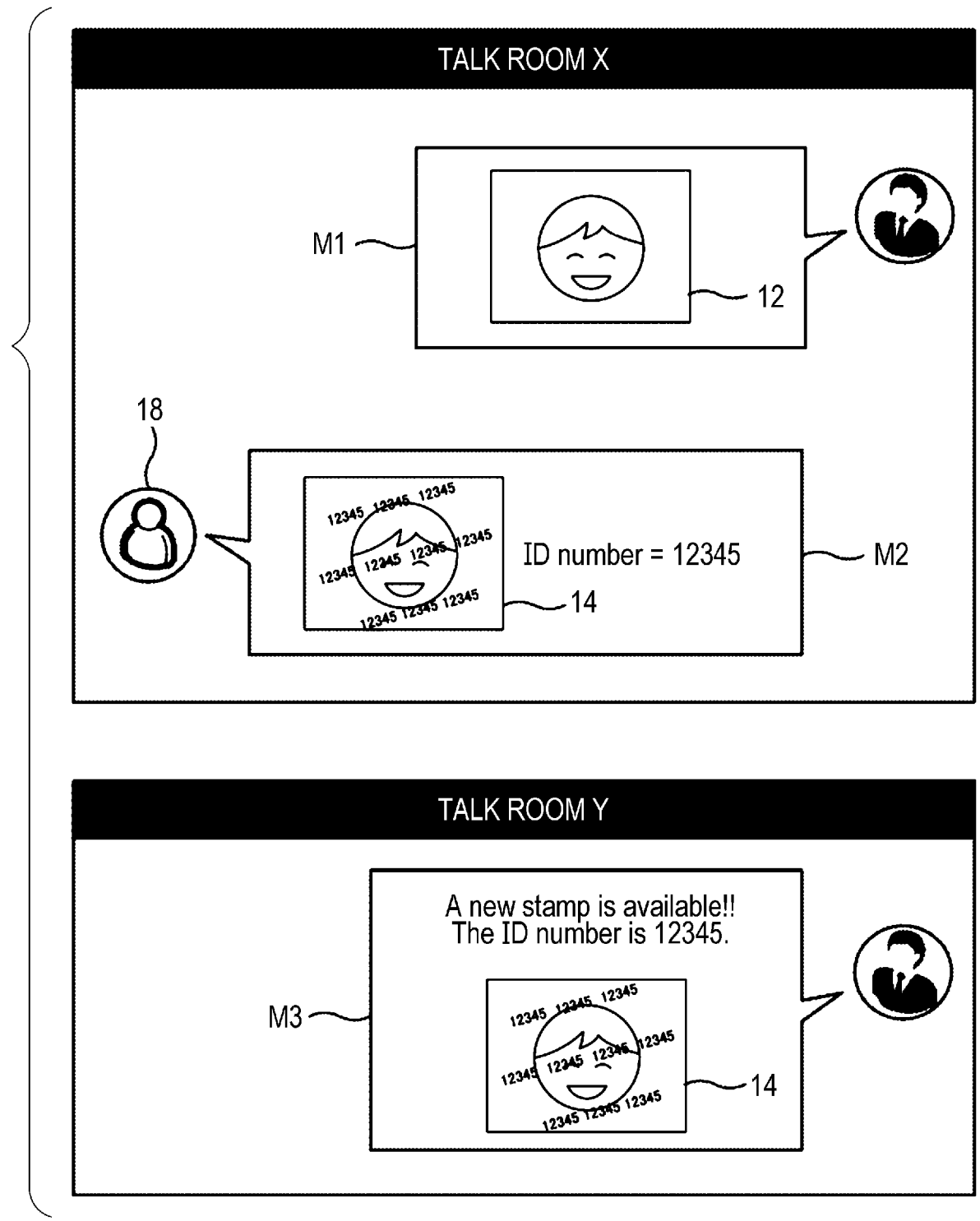
FIG. 8 is a diagram illustrating an example of posting information to a talk room.

FIG. 8 is a diagram illustrating an example of posting information to a talk room, which is performed in the case of sharing the shared image 12 with other users in the control system illustrated in FIG. 1.

A poster having the shared image 12 to be shared with other users posts information M1 including the shared image 12 to a talk room X in which an individual chat with a chatbot is performed, and then information M2 including the presented image 14 for the posted shared image 12 and the identification information of the shared image 12 is returned from the chatbot.

The poster of the shared image 12 posts information M3 including the presented image 14 for the shared image 12 and the identification information of the shared image 12 that have been received from the chatbot to a talk room Y in which other users participate, and accordingly the other users are notified that sharing of the shared image 12 has been started.

Any of the other users interested in the shared image 12 inputs the identification information of the shared image 12 to the image forming device 40, thereby obtaining a printed material of the shared image 12 from the image forming device 40.

Next, the operation of the control device 30 according to this exemplary embodiment will be described.

Figure 9:
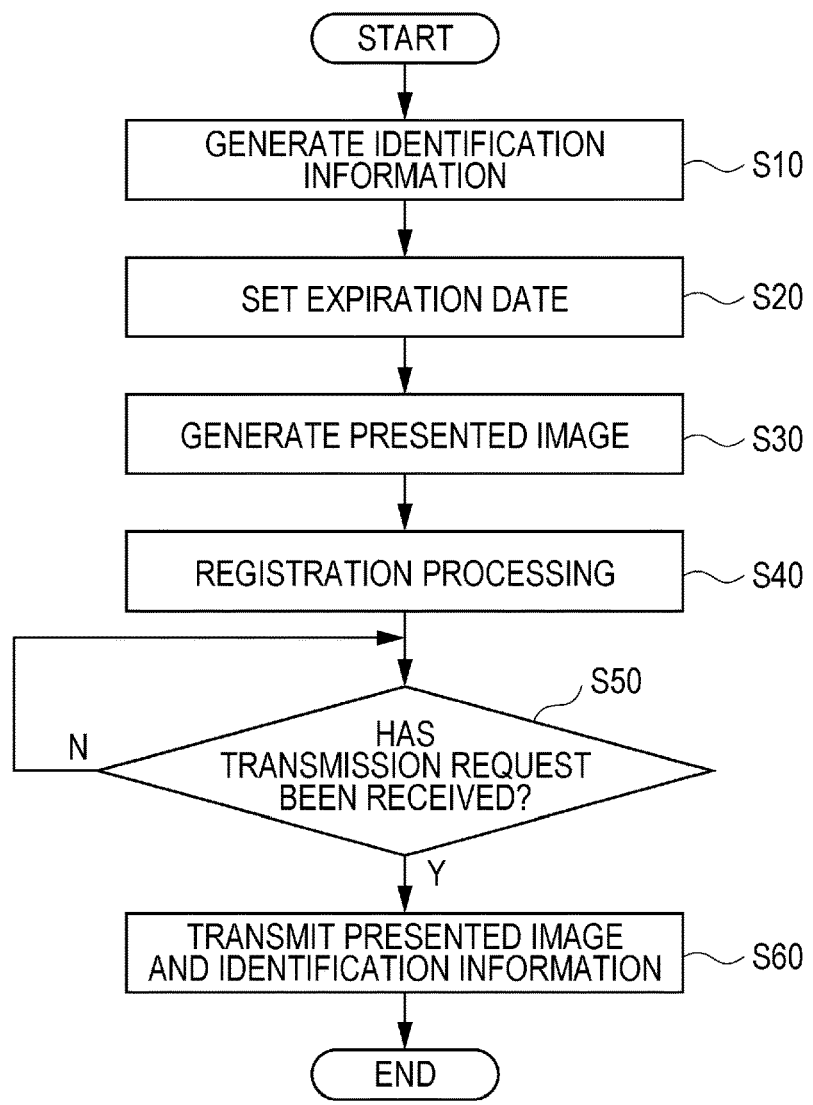
FIG. 9 is a flowchart illustrating an example of a flow of registration processing for a shared image.

FIG. 9 is a flowchart illustrating an example of a flow of registration processing for the shared image 12, which is performed by the CPU 31 in response to receipt of the shared image 12 from a poster through a talk room.

The control program defining the registration processing for the shared image 12 illustrated in FIG. 9 is stored in advance, for example, in the ROM 32 of the control device 30. The CPU 31 of the control device 30 reads the control program stored in the ROM 32 and performs the registration processing for the shared image 12. It is assumed that the shared image 12 that has been received is stored, for example, in the storage 34 together with the poster ID of the poster who has posted the shared image 12.

In step S10, the CPU 31 generates identification information of the received shared image 12.

In step S20, the CPU 31 sets an expiration date of the received shared image 12. The expiration date set by the CPU 31 is, for example, the day a predetermined number of days after the day when the shared image 12 is received. In a case where the poster posts the shared image 12 to the talk room with the expiration date of the shared image 12 designated, the CPU 31 sets the expiration date designated by the poster as the expiration date of the shared image 12.

In step S30, the CPU 31 generates the presented image 14 for the received shared image 12 and stores the generated presented image 14, for example, in the storage 34.

In this case, the CPU 31 generates, as the presented image 14, an image that is obtained by processing the shared image 12 such that the image is different from the received shared image 12. For example, the CPU 31 generates, as the presented image 14, an image that is obtained by superimposing the identification information generated in step S10 on the shared image 12, as illustrated in FIG. 6. The identification information, which is information not included in the shared image 12, is an example of additional information according to this exemplary embodiment.

The type of processing to be performed on the shared image 12 to generate the presented image 14 is set in advance. The above-described example is a processing example in a case where the processing of superimposing identification information on the shared image 12 is set.

The processing example of superimposing identification information on the shared image 12 has been described as an example. For another example, information indicating the poster of the shared image 12, such as the creator name of the shared image 12, that is, a "sign", may be superimposed on the shared image 12. Alternatively, the name of a character included in the shared image 12, the file name of the shared image 12, or the expiration date set in step S20 may be superimposed on the shared image 12. Furthermore, an image prepared in advance in the control device 30, such as an icon 18 representing a chatbot illustrated in FIG. 8, may be superimposed on the shared image 12 as well as text. The sign, the name of a character, the file name, the expiration date, and the image that are not included in the shared image 12 are also examples of additional information according to this exemplary embodiment. Alternatively, a combination of plural pieces of additional information may be superimposed on the shared image 12.

In the case of superimposing additional information on the shared image 12, the density of a color used to display the additional information may be lower than the density of a color of the shared image 12 so that the shared image 12 is clearly seen. Alternatively, additional information with a predetermined transparency may be superimposed on the shared image 12 so that the additional information looks like a watermark on the shared image 12.

In the case of superimposing additional information on the shared image 12, the CPU 31 may identify the displayed content of the shared image 12 and may prevent superimposition of the additional information on a specific region of the shared image 12.

Figure 10:
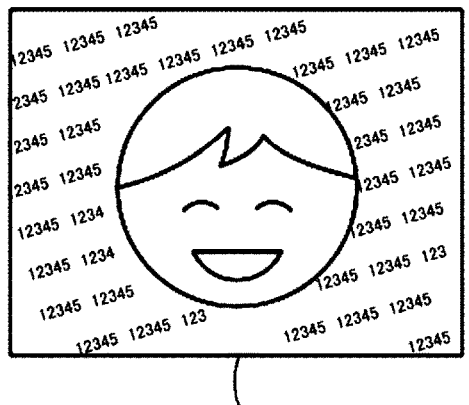
FIG. 10 is a diagram illustrating an example of a presented image generated so as not to superimpose additional information on a specific region.

FIG. 10 is a diagram illustrating an example of the presented image 14 generated so as not to superimpose additional information on the region corresponding to the face of a person. The region corresponding to the face of an existing living creature, such as a human or animal, or an imaginary creature, such as a mascot character, is a region having a more distinctive characteristic of the shared image 12 than the other regions. Thus, the creator of the shared image 12 may worry about superimposition of additional information on the region corresponding to the face. Thus, the CPU 31 may prevent additional information from being superimposed on the region designated not to display additional information by the poster of the shared image 12.

Here, a description has been given of an example in which the region corresponding to the face is set as a specific region in which additional information is not superimposed. However, the specific region in which additional information is not superimposed is not limited to the region corresponding to the face of a person. For example, in a case where additional information is expressed by text and the shared image 12 includes text, the text in the shared image 12 is difficult to read if additional information is superimposed on the text in the shared image 12. In this case, the additional information may be superimposed while avoiding the text portion in the shared image 12. In this way, the CPU 31 does not superimpose additional information on a region where superimposition of the additional information makes it difficult to determine the content and characteristics of the shared image 12.

The designation of such a specific region is notified to the control device 30 by the poster of the shared image 12 as a result of posting the designation together with the shared image 12 to the talk room. In response to the instruction from the poster of the shared image 12, the CPU 31 sets the specific region where superimposition of additional image is to be avoided on the shared image 12.

In step S40, the CPU 31 performs registration processing of registering, in the registration table 16, the received shared image 12, the identification information generated in step S10, the expiration date set in step S20, the presented image 14 generated in step S30, and the poster ID of the poster of the shared image 12 in association with each other.

The poster of the shared image 12 posts a transmission request for requesting the chatbot to transmit the presented image 14 for the posted shared image 12 and identification information, for example, "please transmit a presented image and identification information!", to the talk room. The transmission request for requesting the chatbot to transmit the presented image 14 and identification information is an example of a request from the poster according to this exemplary embodiment.

Thus, in step S50, the CPU 31 determines whether or not a transmission request has been received from the poster of the shared image 12. To prompt the poster of the shared image 12 to post a transmission request, the CPU 31 may perform, between steps S40 and S50, processing of posting to the talk room a completion notification indicating that the presented image 14 and identification information are ready to be transmitted.

If a transmission request has not been received, the CPU 31 repeats the determination in step S50 to monitor posting of a transmission request by the poster of the shared image 12. On the other hand, if a transmission request has been received, the processing proceeds to step S60.

In step S60, the CPU 31 posts the identification information generated in step S10 and the presented image 14 generated in step S30 to the talk room. Accordingly, the presented image 14 and the identification information are transmitted to the user terminal 10 that is used by the poster to transmit the transmission request.

In a case where the presented image 14 is generated in step S30 by superimposing the identification information on the shared image 12, the identification information is transmitted when the presented image 14 is transmitted. The information transmitted to the poster of the shared image 12 is not limited to the presented image 14 and the identification information. For example, information regarding acquisition of the shared image 12, such as the expiration date of the shared image 12 or the amount to be charged on another user for obtaining the shared image 12, may also be transmitted.

In a case where the registration table 16 has, registered therein, another presented image 14 corresponding to a shared image 12 that is different from the received shared image 12, that has previously been posted by the poster, and that has not expired, the CPU 31 may post the other presented image 14 to the talk room together with the presented image 14 generated in step S30.

Every time information is posted to the talk room, the display screen is scrolled and previously posted information disappears from the display screen. Thus, to search for previously posted information, for example, the display screen of the talk room is scrolled in a direction opposite to the direction of scrolling the display screen when information is posted, thereby finding desired information. However, when the poster posts the shared image 12 to the talk room, if the chatbot posts not only the presented image 14 of the shared image 12 posted last by the poster but also the presented image 14 of a previously posted shared image 12, the time and effort to search for the presented image 14 of the previously posted shared image 12 are saved.

Accordingly, the registration processing for the shared image 12 illustrated in FIG. 9 ends.

In the registration processing for the shared image 12 illustrated in FIG. 9, the chatbot posts the presented image 14 and identification information to the talk room in response to a transmission request posted by the poster of the shared image 12 to the talk room. However, the registration processing for the shared image 12 does not necessarily require a transmission request from the poster of the shared image 12. The control device 30 may perform step S60 immediately after step S40 even if a transmission request is not posted by the poster of the shared image 12.

According to the example described above, the presented image 14 is generated by superimposing identification information on the shared image 12 in step S30 in FIG. 9, but the processing to be performed on the shared image 12 is not limited thereto.

For example, the control device 30 may divide the received shared image 12 into plural image regions and may use an image corresponding to one of the plural image regions (hereinafter referred to as a "partial image") of the shared image 12 as the presented image 14. Such division of the shared image 12 is also referred to as "trimming".

Figure 11:
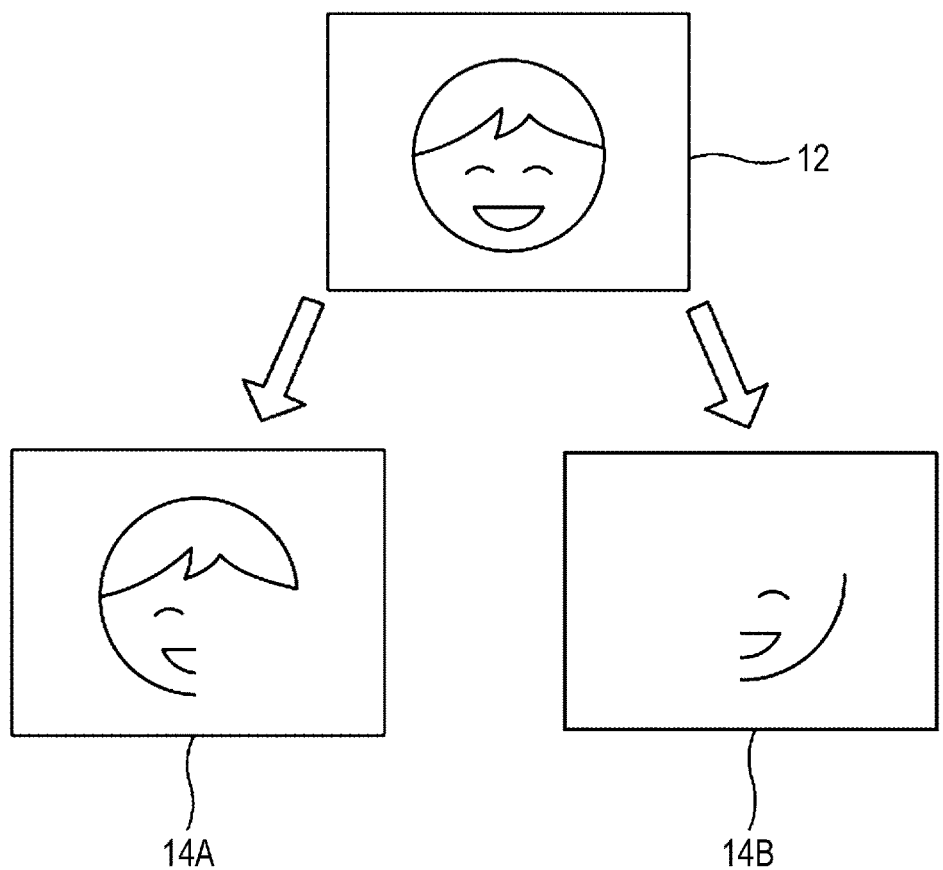
FIG. 11 is a diagram illustrating an example of a presented image obtained through trimming.

FIG. 11 is a diagram illustrating an example of the presented image 14 using partial images. In the example illustrated in FIG. 11, the received shared image 12 is divided into two partial images 14A and 14B. Each partial image includes an image in a region of the complete shared image 12 that does not overlap the image included in the other partial image. The control device 30 sets any one of the plural partial images as the presented image 14 and stores the other partial image in the storage 34 in association with an identification number.

That is, the presented image 14 released to other users corresponds to a part of the shared image 12, which makes it difficult for the other users to imagine the entire shared image 12 from the presented image 14. Accordingly, expectations for obtaining the shared image 12 may be raised compared to the case where the presented image 14 including the whole part of the shared image 12 is released.

Furthermore, the other partial image obtained by dividing the same shared image 12 to generate the presented image 14 is stored in the control device 30. The other partial image is not released to the other users. Thus, by combining the presented image 14 with the other partial image like a tally, it is certified that the shared image 12 represented by the presented image 14 is an image created by the poster identified by the poster ID associated with the shared image 12.

Alternatively, the control device 30 may use an image generated by decreasing the resolution of the shared image 12 as the presented image 14.

Figure 12:
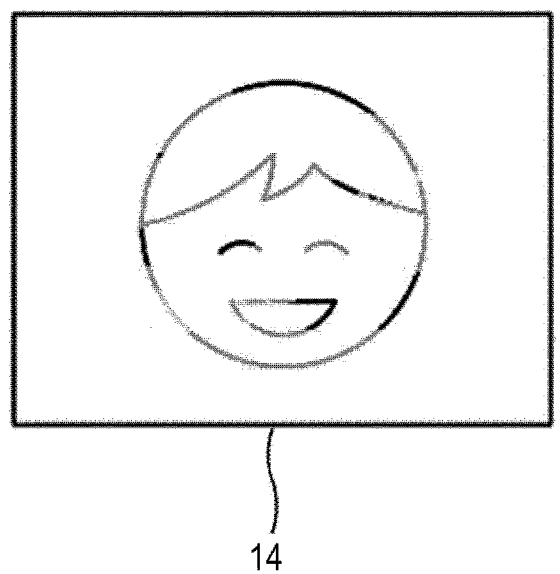
FIG. 12 is a diagram illustrating an example of a presented image with a decreased resolution.

FIG. 12 is a diagram illustrating an example of the presented image 14 generated by decreasing the resolution of the shared image 12. In this case, the whole part of the shared image 12 is shown to the other users. However, the presented image 14 is displayed at a lower resolution, and thus the original shared image 12 is protected.

In some cases, a user may be in a condition with a non-favorable communication environment, for example, the user may be in a place where radio signals are hard to reach, or a communication speed is restricted. In such a case, if the presented image 14 with a data size exceeding a predetermined data size is transmitted to the user terminal 10, the user terminal 10 may be unable to receive the presented image 14 or another operation using the user terminal 10 is affected. Thus, the poster of the shared image 12 may set in advance the data size of the presented image 14 to be transmitted by the control device 30, that is, an upper limit value of the capacity of the presented image 14, in the control device 30.

In a case where the upper limit value of the capacity of the presented image 14 is predetermined, the control device 30 decreases the resolution of the shared image 12 so that the capacity of the presented image 14 becomes smaller than or equal to the upper limit value.

The control device 30 may, for example, perform color-to-monochrome conversion on the shared image 12, display only the contours of the shared image 12 without painting the image in colors, or the like instead of decreasing the resolution of the shared image 12, so that the capacity of the presented image 14 becomes smaller than or equal to the upper limit value. Alternatively, the control device 30 may decrease the resolution in a partial region without decreasing the resolution in a specific region of the shared image 12, instead of decreasing the resolution of the entire shared image 12. The upper limit value of the capacity of the presented image 14 may be set for each poster of the shared image 12, or an upper limit value common to all the posters may be set by the control device 30.

The processing performed on the shared image 12 described above causes a difference in appearance between the shared image 12 and the presented image 14, but the processing performed on the shared image 12 is not limited to processing that causes a difference in appearance. The processing that does not cause a difference in appearance between the shared image 12 and the presented image 14 may be performed as long as the presented image 14 is prevented from being illicitly used by a person without permission of the poster of the shared image 12 compared to a case where the shared image 12 is used as the presented image 14.

Specifically, the control device 30 may use, as the presented image 14, the shared image 12 embedded with a program that causes the presented image 14 to be erased on a predetermined date. In this case, even if a malicious person obtains the presented image 14, the presented image 14 is erased from a storage device on the predetermined date.

Alternatively, the control device 30 may use, as the presented image 14, the shared image 12 embedded with an electronic watermark that does not affect display of the shared image 12. The electronic watermark includes information indicating the source of the shared image 12, for example, the name of the creator of the shared image 12, the date on which the shared image 12 is created, and the like.

The control device 30 transmits, to the poster of the shared image 12, the presented image 14 obtained by performing at least one of the above-described processing operations. Accordingly, even if the poster notifies, by using the presented image 14, other users that sharing of the shared image 12 has been started, the shared image 12 is not released to other persons including the other users before the other users obtain the shared image 12 from the image forming device 40. In addition, it is not necessary for the poster of the shared image 12 to generate the presented image 14 by processing the shared image 12.

On the other hand, when the control device 30 receives, from the image forming device 40 operated by a user who wants the shared image 12 introduced by using the presented image 14 that has been generated, identification information transmitted together with the presented image 14, the control device 30 performs print processing of printing the shared image 12 associated with the identification information.

Figure 13:
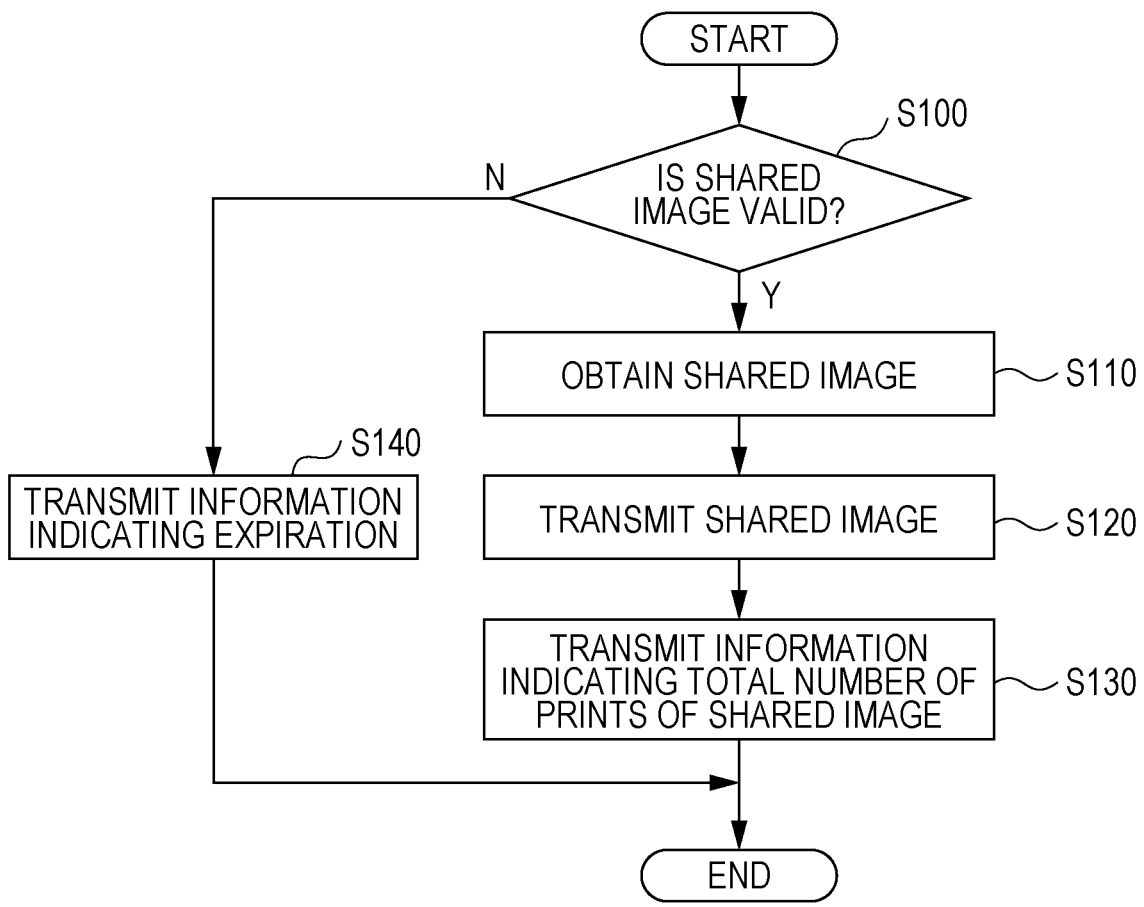
FIG. 13 is a flowchart illustrating an example of a flow of print processing for a shared image.

FIG. 13 is a flowchart illustrating an example of a flow of print processing for the shared image 12 performed by the CPU 31 in response to receipt of identification information.

The control program defining the print processing for the shared image 12 illustrated in FIG. 13 is stored in advance, for example, in the ROM 32 of the control device 30. The CPU 31 of the control device 30 reads the control program stored in the ROM 32 and performs the print processing for the shared image 12.

In step S100, the CPU 31 refers to the registration table 16 to obtain the expiration date of the shared image 12 associated with the received identification information. Subsequently, the CPU 31 compares the obtained expiration date with the date on which the identification information is received, and determines whether or not the date on which the identification information is received is after the expiration date of the shared image 12, that is, whether or not the shared image 12 associated with the identification information is valid. The date on which the identification information is received is obtained by, for example, using a calendar function included in the CPU 31. Alternatively, the date may be obtained from a time server connected to the communication line 50 through the communication I/F 37.

If the date on which the identification information is received is on or before the expiration date of the shared image 12, the processing proceeds to step S110.

In step S110, the CPU 31 refers to the registration table 16 to obtain the shared image 12 associated with the received identification information from the storage 34 in accordance with the details of the shared image information.

In step S120, the CPU 31 transmits the shared image 12 obtained in step S110 to the image forming device 40 from which the identification information has been received. Accordingly, the image forming device 40 receives the shared image 12 and starts printing the shared image 12.

For example, in a case where the shared image 12 includes three-dimensional data that three-dimensionally expresses an object and in a case where the image forming device 40 has a modeling function of modeling a three-dimensional object, such as a three-dimensional printer, an object represented by the shared image 12 may be three-dimensionally modeled in response to an instruction from the user who operates the image forming device 40.

In step S130, the CPU 31 transmits information about the printing performed in the image forming device 40 to the poster of the shared image 12 that has been printed. The CPU 31 may transmit any information about the printing to the poster of the shared image 12 that has been printed. As an example, the CPU 31 posts, to the talk room in which the poster of the printed shared image 12 participates, information including the total number of prints of the shared image 12 associated with the received identification information. This enables the poster of the shared image 12 to know the popularity of the shared image 12 posted by him/her.

The information including the total number of prints of the shared image 12 may include, for example, information about the area in which the image forming device 40 that has printed the shared image 12 is installed, the time at which the shared image 12 is printed, and the time elapsed from when sharing of the shared image 12 is started to when the shared image 12 is printed. The information about the area in which the image forming device 40 that has printed the shared image 12 is installed is set on the basis of a device ID or the like of the image forming device 40 that has transmitted the identification information. The time at which the shared image 12 is printed, and the time elapsed from when sharing of the shared image 12 is started to when the shared image 12 is printed are set on the basis of the time at which the identification information is received. In the case of setting the time elapsed from when sharing of the shared image 12 is started to when the shared image 12 is printed, the date and time when the shared image 12 is posted may be registered in the registration table 16.

It is not necessary for the CPU 31 to post information including the total number of prints of the printed shared image 12 to the talk room every time the shared image 12 is printed by the image forming device 40. The CPU 31 may post the total number of prints of the printed shared image 12 to the talk room every time a predetermined number of prints are produced.

On the other hand, if it is determined in the determination in step S100 that the date on which the identification information is received is after the expiration date of the shared image 12, the processing proceeds to step S140.

In this case, the shared image 12 to be shared with other users has expired, and thus the CPU 31 transmits, to the image forming device 40 from which the identification information has been received, information indicating that the shared image 12 has expired, not the shared image 12 associated with the received identification information. In this case, the image forming device 40 does not print the shared image 12.

Accordingly, the print processing for the shared image 12 illustrated in FIG. 13 ends.

As described above, the control device 30 according to this exemplary embodiment posts, to the talk room, the presented image 14 obtained by processing the shared image 12 such that the presented image 14 is different from the shared image 12, and identification information. When receiving identification information from the image forming device 40, the control device 30 performs control so that the shared image 12 associated with the identification information is printed by the image forming device 40.

First Modification Example of Exemplary Embodiment

When the above-described control device 30 receives the shared image 12, the control device 30 transmits the presented image 14 generated from the shared image 12 to the poster of the shared image 12. However, the poster of the shared image 12 does not necessarily require the presented image 14.

For example, in a case where the poster of the shared image 12 prints the shared image 12 by using the image forming device 40, it is sufficient for the control device 30 to transmit only identification information to the poster of the shared image 12 because the poster knows what the shared image 12 is like. Also, in a case where the poster of the shared image 12 generates the presented image 14 or in a case where the poster of the shared image 12 does not desire the control device 30 to generate the presented image 14 for some reasons, it is sufficient for the control device 30 to transmit only the identification information to the poster of the shared image 12.

Furthermore, in a case where the shared image 12 is an image that has already been released to other users, the other users know the content of the shared image 12 without viewing the presented image 14, and thus it is sufficient for the control device 30 to transmit only the identification information to the poster of the shared image 12.

Thus, a description will be given of the control device 30 that generates the presented image 14 in accordance with necessity/unnecessity information indicating whether or not the presented image 14 is necessary, given by the poster of the shared image 12. The hardware configuration and the functional configuration of the control device 30 according to this modification example are the same as those in FIGS. 3 and 5, respectively, and thus the description thereof will not be given.

Figure 14:
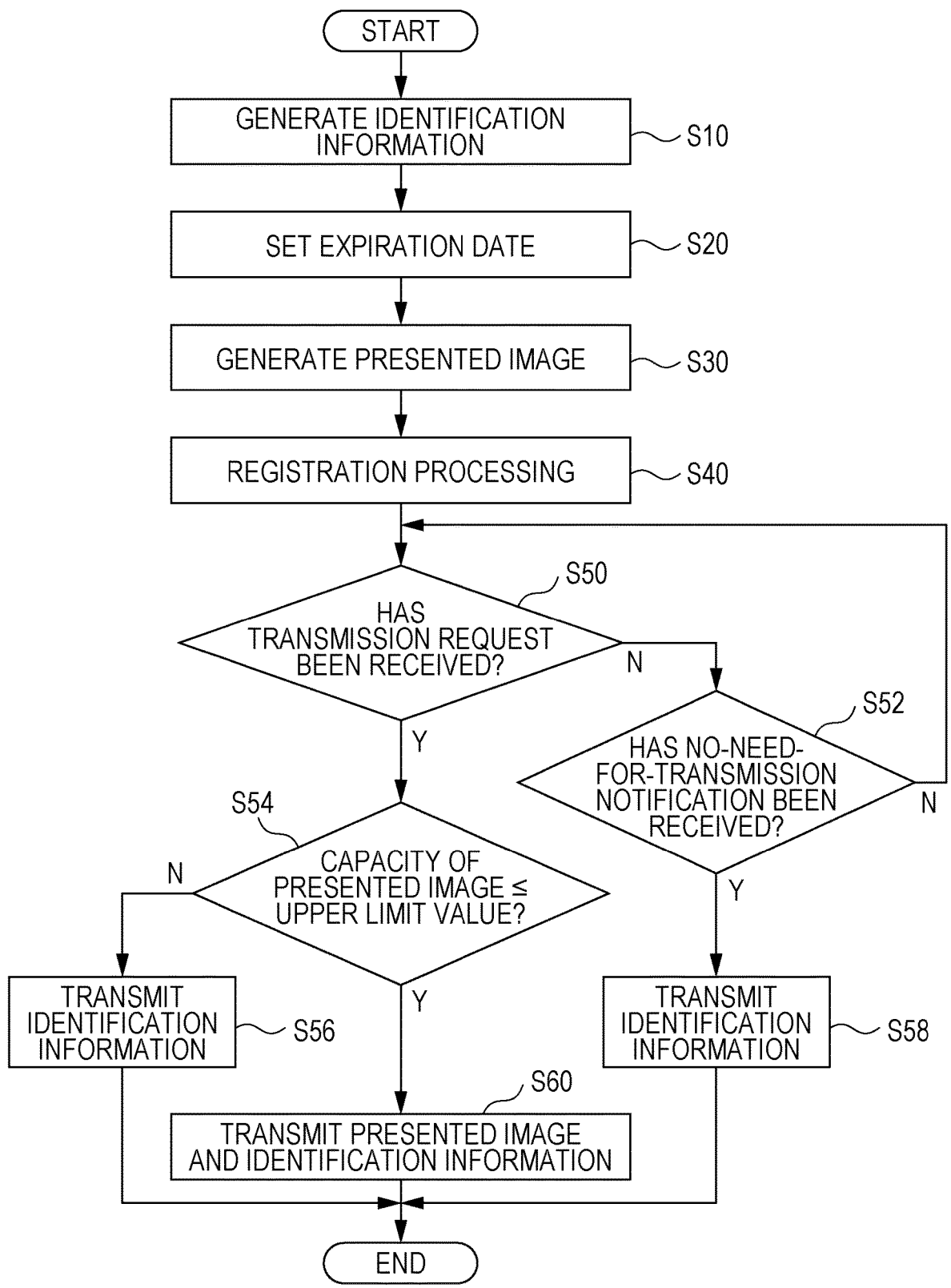
FIG. 14 is a flowchart illustrating registration processing for a shared image according to a modification example.

FIG. 14 is a flowchart illustrating an example of a flow of registration processing for the shared image 12, performed by the CPU 31 in response to receipt of the shared image 12 from a poster through a talk room. The control program defining the registration processing for the shared image 12 illustrated in FIG. 14 is stored in advance, for example, in the ROM 32 of the control device 30. The CPU 31 of the control device 30 reads the control program stored in the ROM 32 and performs the registration processing for the shared image 12.

The flowchart illustrated in FIG. 14 is different from the flowchart of the registration processing for the shared image 12 illustrated in FIG. 9 in that steps S52 to S58 are added.

If it is determined in the determination in step S50 that a transmission request has not been received from the poster of the shared image 12, step S52 is performed.

In a case where the poster of the shared image 12 does not require the presented image 14, the poster posts a no-need-for-transmission notification about the presented image 14 to the talk room, instead of posting a transmission request.

Thus, in step S52, the CPU 31 determines whether or not a no-need-for-transmission notification about the presented image 14 has been received from the poster of the shared image 12. If the no-need-for-transmission notification has not been received, the processing returns to step S50, and the determination in steps S50 and S52 is repeated until a transmission request or a no-need-for-transmission notification is received. The transmission request and the no-need-for-transmission notification are examples of necessity/unnecessity information indicating whether or not the presented image 14 is necessary.

If it is determined in the determination in step S52 that a no-need-for-transmission notification about the presented image 14 has been received, the processing proceeds to step S58.

In this case, it is not necessary to transmit the presented image 14 corresponding to the shared image 12 and generated in step S30. Thus, in step S58, the CPU 31 posts the identification information generated in step S10 to the talk room, and ends the registration processing for the shared image 12 illustrated in FIG. 14.

On the other hand, if it is determined in the determination in step S50 that a transmission request has been received, the processing proceeds to step S54.

As described above, the upper limit value of the capacity of the presented image 14 allowed by the poster of the shared image 12 may be set to the control device 30 by the poster of the shared image 12. The setting of the upper limit value is regarded as the intention of the poster that the presented image 14 having a capacity exceeding the upper limit value is not necessary.

Thus, in step S54, the CPU 31 determines whether or not the capacity of the presented image 14 generated in step S30 is smaller than or equal to the upper limit value set by the poster of the shared image 12. If the capacity of the presented image 14 is larger than the upper limit value, the processing proceeds to step S56.

In this case, the CPU 31 does not transmit the presented image 14 to the poster of the shared image 12. Thus, the CPU 31 posts the identification information generated in step S10 to the talk room in step S56, and then ends the registration processing for the shared image 12 illustrated in FIG. 14. Alternatively, the CPU 31 may post, to the talk room, information for notifying the poster of the shared image 12 that the presented image 14 is not to be transmitted, together with the identification information in step S56.

On the other hand, if it is determined in the determination in step S54 that the capacity of the presented image 14 is smaller than or equal to the upper limit value, the processing proceeds to step S60. In step S60, as described above, the CPU 31 posts the identification information generated in step S10 and the presented image 14 generated in step S30 to the talk room, and then ends the registration processing for the shared image 12 illustrated in FIG. 14.

In the registration processing for the shared image 12 illustrated in FIG. 14, a no-need-for-transmission notification is received after the shared image 12 is received, and thus the presented image 14 is generated even if the presented image 14 is not necessary. Thus, the poster of the shared image 12 may post a no-need-for-transmission notification together with the shared image 12 to the talk room. In this case, the CPU 31 determines, before performing step S30, whether or not a no-need-for-transmission notification has been received. If a no-need-for-transmission notification has been received, the processing proceeds to step S40 with step S30 being skipped. On the other hand, if a no-need-for-transmission notification has not been received, step S30 is performed to generate the presented image 14. In a case where the presented image 14 is not generated, the CPU 31 does not transmit the presented image 14, and may transmit the identification information to the poster of the shared image 12.

Second Modification Example of Exemplary Embodiment

A description has been given above of the control device 30 that transmits, when receiving the shared image 12, the presented image 14 of the received shared image 12 and identification information, and that transmits, when receiving identification information, the shared image 12 associated with the identification information to the image forming device 40. The control device 30 also receives other various pieces of information.

Now, a description will be given of the control device 30 that switches processing to be performed in accordance with the type of received information and the source of the information. The hardware configuration and the functional configuration of the control device 30 according to this modification example are the same as those in FIGS. 3 and 5, respectively, and thus the description thereof will not be given.

Figure 15:
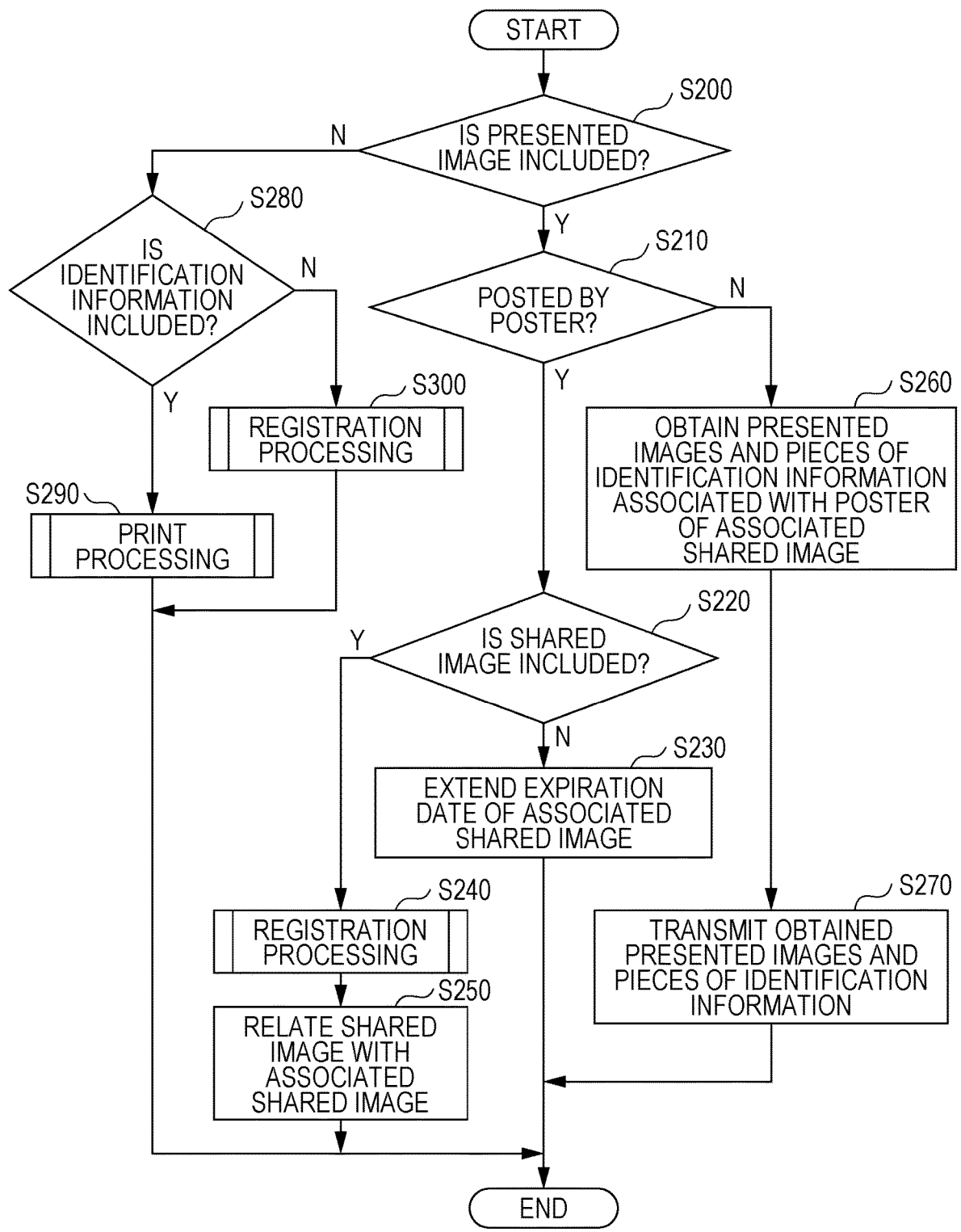
FIG. 15 is a flowchart illustrating an example of a flow of information processing.

FIG. 15 is a flowchart illustrating an example of a flow of information processing performed by the CPU 31 when the control device 30 receives some information. The control program defining the information processing illustrated in FIG. 15 is stored in advance, for example, in the ROM 32 of the control device 30. The CPU 31 of the control device 30 reads the control program stored in the ROM 32 and performs the information processing.

In step S200, the CPU 31 determines whether or not the received information includes the presented image 14 that has previously been transmitted to the poster of the shared image 12 by the control device 30. Specifically, if a file name included in the received information is registered in the presented image information in the registration table 16, the CPU 31 determines that the received information includes the presented image 14. If the presented image 14 is included, the processing proceeds to step S210.

In step S210, the CPU 31 performs control to switch the processing to be performed in accordance with the source of the presented image 14. For this purpose, the CPU 31 determines whether or not the source of the received presented image 14 is identical to the poster of the shared image 12 associated with the received presented image 14 (hereinafter referred to as an "associated shared image 12"). Specifically, if the poster ID associated with the received presented image 14 matches the poster ID of the poster who has posted the presented image 14 in the registration table 16, the CPU 31 determines that the source of the presented image 14 is identical to the poster of the associated shared image 12.

If the source of the presented image 14 is identical to the poster of the associated shared image 12, the processing proceeds to step S220.

In step S220, the CPU 31 determines whether or not the received information also includes the shared image 12. Specifically, if the received information includes a file other than the presented image 14 and if the file name of the file is different from any of the file names registered in the shared image information and presented image information in the registration table 16, the CPU 31 determines that the received information includes the shared image 12. If the received information does not include the shared image 12, the processing proceeds to step S230.

According to the results of the above-described determinations, it is assumed that the control device 30 is in a situation of having received the presented image 14 for the shared image 12 previously posted by the poster from the poster of the shared image 12 represented by the presented image 14.

In this case, in step S230, the CPU 31 refers to the registration table 16 to extend the expiration date of the associated shared image 12. The CPU 31 generates a new expiration date by adding the number of dates stored in advance in the storage 34 to the expiration date of the associated shared image 12, updates the expiration date of the associated shared image 12 to the new expiration date, and ends the information processing illustrated in FIG. 15.

That is, the control device 30 extends the expiration date of the associated shared image 12 when receiving, from the poster of the previously posted shared image 12, the presented image 14 of the shared image 12 posted by the poster.

If it is determined in the determination in step S220 that the received information also includes the shared image 12, the processing proceeds to step S240.

According to the results of the above-described determinations, it is assumed that the control device 30 is in a situation of having received the presented image 14 for the shared image 12 previously posted by the poster from the poster of the shared image 12 represented by the presented image 14, and having received a new shared image 12 different from any shared images 12 that have been posted by the poster.

In this case, in step S240, the CPU 31 performs the registration processing for the shared image 12 described above with reference to FIG. 9 on the new shared image 12 in response to receipt of the new shared image 12.

In step S250, the CPU 31 relates the received new shared image 12 to the shared image 12 associated with the received presented image 14, that is, the associated shared image 12. Specifically, as illustrated in FIG. 16, a related shared image column is provided in the registration table 16, the identification information of the associated shared image 12 (in the example in FIG. 16, the shared image 12 whose identification information is "12345") is set in the related shared image column of the new shared image 12 (in the example in FIG. 16, the shared image 12 whose identification information is "12347"), and the identification information of the new shared image 12 is set in the related shared image column of the associated shared image 12, thereby relating the new shared image 12 to the associated shared image 12. After that, the information processing illustrated in FIG. 15 ends.

In a case where the shared images 12 are related to each other, the print processing that is performed when receiving the identification information associated with one of the related shared images 12 from the image forming device 40 is different from the print processing for the shared image 12 illustrated in FIG. 13. This will be described below.

In a case where the received information includes the new shared image 12 and plural presented images 14, individual pieces of identification information between the new shared image 12 and the plural presented images 14 are set in the related shared image column.

On the other hand, if it is determined in the determination in step S210 that the source of the presented image 14 is not the poster of the associated shared image 12, the processing proceeds to step S260.

In this case, in step S260, the CPU 31 obtains the presented images 14 and pieces of identification information corresponding to all the shared images 12 that have previously been posted by the poster who has posted the associated shared image 12. Specifically, the CPU 31 refers to the registration table 16 to obtain, from the storage 34, the presented images 14 and pieces of identification information associated with the poster ID identical to the poster ID of the associated shared image 12.

In step S270, the CPU 31 posts, to the talk room, the presented images 14 and pieces of identification information obtained in step S260 and addressed to the user from which the presented image 14 has been received, and ends the information processing illustrated in FIG. 15.

Accordingly, the user who has posted to the talk room the presented image 14 of the shared image 12 different from the shared image 12 posted by the user is able to obtain the presented image 14 of another shared image 12 created by the creator of the shared image 12 represented by the posted presented image 14. That is, by posting the presented image 14 of a favorite creator to the talk room, the user is able to obtain a list of works created by the creator.

In step S260, the presented images 14 for all the shared images 12 that have previously been posted by the poster of the associated shared image 12 are obtained. Alternatively, the presented images 14 associated with valid shared images 12 and the respective pieces of identification information may be addressed to the user from which the presented image 14 has been received and may be posted to the talk room. The user views a list of the presented images 14 received from the control device 30, and if there is a work that the user wants, the user may obtain the work from the image forming device 40 by using the corresponding identification information.

On the other hand, if it is determined in the determination in step S200 that the received information does not include the presented image 14, the processing proceeds to step S280.

In step S280, the CPU 31 determines whether or not the received information includes identification information. The CPU 31 determines that identification information is included if the identification information column of the registration table 16 includes the same information as the received information. If the received information includes identification information, the processing proceeds to step S290.

In step S290, the CPU 31 performs print processing, which will be described below with reference to FIG. 17, and then ends the information processing illustrated in FIG. 15. On the other hand, if the received information does not include identification information, the processing proceeds to step S300. In this case, it is considered that the received information is the shared image 12. Thus, in step S300, the CPU 31 performs the registration processing for the shared image 12 described above with reference to FIG. 9 or 14, and then ends the information processing illustrated in FIG. 15.

Next, a description will be given of the print processing for the shared image 12 performed in step S290 in FIG. 15.

Figure 17:
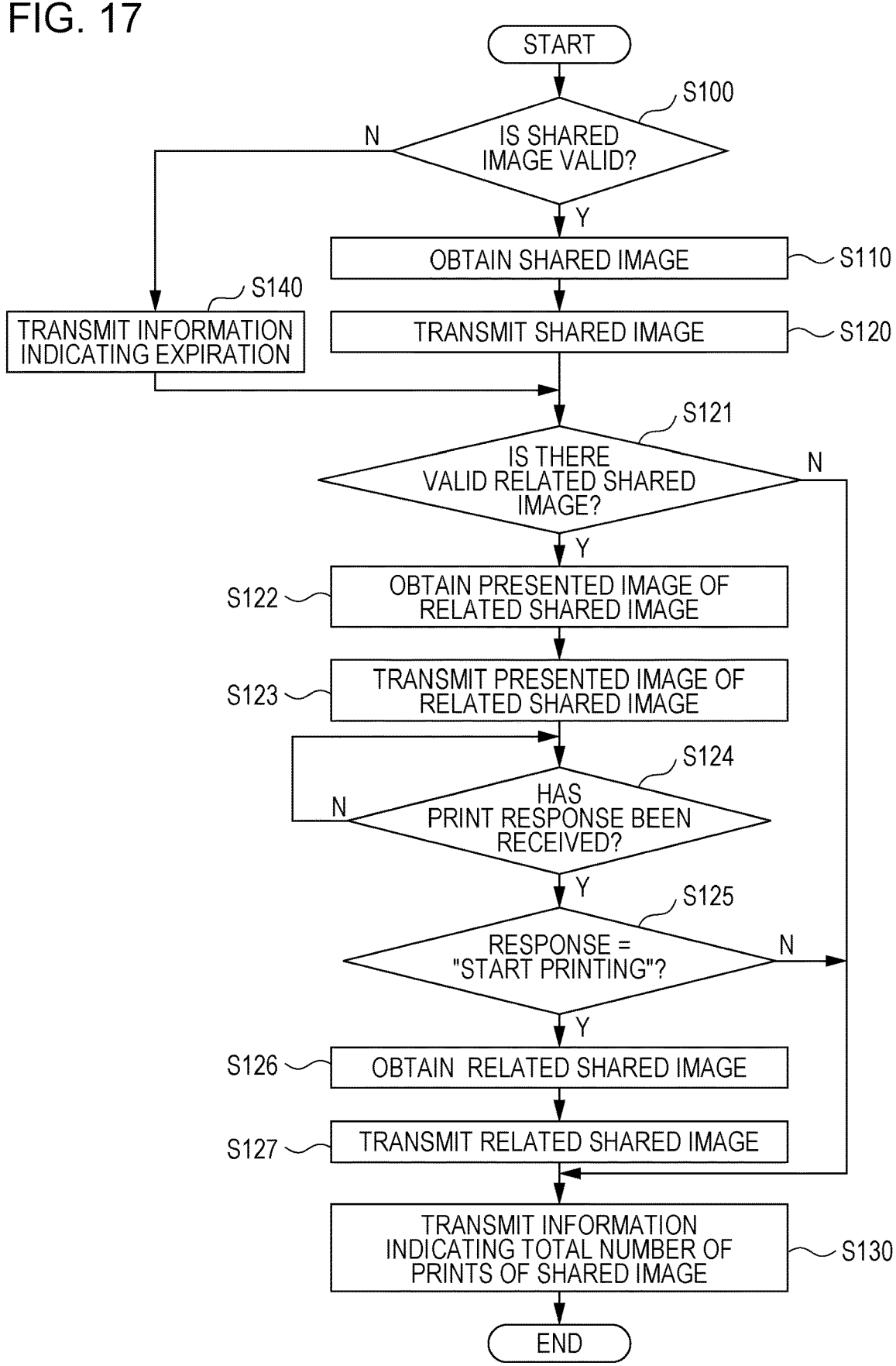
FIG. 17 is a flowchart illustrating print processing for a shared image according to a modification example.

FIG. 17 is a flowchart illustrating a modification example of a flow of print processing for the shared image 12 performed by the CPU 31 in response to receipt of identification information. The control program defining the print processing for the shared image 12 illustrated in FIG. 17 is stored in advance, for example, in the ROM 32 of the control device 30. The CPU 31 of the control device 30 reads the control program stored in the ROM 32 and performs the print processing for the shared image 12.

The flowchart illustrated FIG. 17 is different from the flowchart of the print processing for the shared image 12 illustrated in FIG. 13 in that steps S121 to S127 are added. Other than that, the flowchart in FIG. 17 is the same as that in FIG. 13.

Step S121 is performed after the shared image 12 associated with the received identification information is transmitted in step S120 or after a notification indicating that the shared image 12 associated with the received identification information has expired is transmitted in step S140.

In step S121, the CPU 31 refers to the registration table 16 to determine whether or not a valid related shared image 12 is associated with the received identification information.

Specifically, the CPU 31 determines that the related shared image 12 is set if some identification information is set in the related shared image column associated with the received identification information. The identification information set in the related shared image column is referred to as "related identification information". The CPU 31 also refers to the expiration date column of the registration table 16 to determine whether or not the shared image 12 associated with the related identification information, that is, the related shared image 12, is valid.

If the valid related shared image 12 is associated with the received identification information, the processing proceeds to step S122, where preparation for starting printing of the related shared image 12 is performed.

For this purpose, in step S122, the CPU 31 refers to the registration table 16 to obtain, from the storage 34, the presented image 14 associated with the related shared image 12.

In step S123, the CPU 31 transmits the presented image 14 of the related shared image 12 obtained in step S122 to the image forming device 40 from which the identification information has been received. Accordingly, information indicating that there is a recommended shared image 12 related to the shared image 12 represented by the identification information input by the user to the image forming device 40 is displayed, together with the presented image 14 of the related shared image 12, on the display screen of the image forming device 40 that has received the presented image 14 of the related shared image 12.

In response to this, the user inputs a print response indicating whether or not to start printing the related shared image 12 to the image forming device 40. The image forming device 40 transmits the input print response to the control device 30.

In response to this, in step S124, the CPU 31 determines whether or not the print response has been received from the image forming device 40. If the print response has not been received, the determination in step S124 is repeatedly performed to monitor the reception of the print response. If the print response has been received, the processing proceeds to step S125.

In step S125, the CPU 31 determines whether or not the received print response is a response indicating an instruction to start printing the related shared image 12. If the print response is a response indicating an instruction to start printing the related shared image 12, the processing proceeds to step S126.

In step S126, in response to the instruction to start printing the related shared image 12 from the user, the CPU 31 obtains the related shared image 12 from the storage 34.

In step S127, the CPU 31 transmits the related shared image 12 obtained in step S126 to the image forming device 40 from which the identification information has been received. Accordingly, the image forming device 40 receives the related shared image 12 and starts printing the related shared image 12.

In step S130, the CPU 31 posts information including the total number of prints of the shared image 12 transmitted to the image forming device 40 to the talk room in which the poster of the transmitted shared image 12 participates, and then ends the print processing for the shared image 12 illustrated in FIG. 17.

On the other hand, if it is determined in the determination in step S121 that no valid related shared image 12 is associated with the received identification information, the CPU 31 performs step S130 without performing steps S122 to S127 and ends the print processing for the shared image 12 illustrated in FIG. 17. If it is determined in the determination in step S125 that the received print response indicates that it is not necessary to print the related shared image 12, the CPU 31 performs step S130 without performing steps S126 and S127 and ends the print processing for the shared image 12 illustrated in FIG. 17.

In this way, the control device 30 according to the modification example of this exemplary embodiment switches the specific processing to be performed in accordance with the type of received information and the source of the information.

In this exemplary embodiment, a description has been given of an example in which the shared image 12 and the presented image 14 are transmitted and received by using a social networking service. It is not necessary to use the social networking service as long as the transmission and reception are performed through the communication line 50. For example, the shared image 12 and the presented image 14 may be transmitted and received by email.

While FIG. 1 illustrates the control system in which the talk room server 20 and the control device 30 are independent of each other, the talk room server 20 and the control device 30 may be integrated together.

The exemplary embodiment of the present disclosure has been described above. The present disclosure is not limited to the scope described in the exemplary embodiment. Various changes or improvements may be added to the exemplary embodiment without deviating from the gist of the present disclosure, and an embodiment implemented by adding the changes or improvements is included in the technical scope of the present disclosure. For example, the order of steps in processing may be changed without deviating from the gist of the present disclosure.

In the above exemplary embodiment, a description has been given of, as an example, the case where the registration processing, print processing, and information processing for the shared image 12 are implemented by software. Alternatively, the processing operations equivalent to the flowcharts illustrated in FIGS. 9, 13 to 15, and 17 may be loaded to an application specific integrated circuit (ASIC), for example, and may be performed by hardware. In this case, the processing speed may be increased compared to the case where the registration processing, print processing, and information processing for the shared image 12 are implemented by software.

In the above-described exemplary embodiment, the control program is installed in the ROM 32, but the exemplary embodiment is not limited thereto. The control program according to an exemplary embodiment of the present disclosure can be provided in the form of being recorded on a computer readable storage medium. For example, the control program according to the exemplary embodiment of the present disclosure may be provided in the form of being recorded on an optical disc, such as a compact disc (CD)-ROM or a digital versatile disc (DVD)-ROM. The control program according to the exemplary embodiment of the present disclosure may be provided in the form of being recorded on a semiconductor memory, such as a universal serial bus (USB) or a flash memory. Furthermore, the control device 30 may obtain the control program according to the exemplary embodiment of the present disclosure from an external device connected to the communication line 50 through the communication I/F 37.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control device comprising:
a processor programmed to:
receive a shared image to be shared with a user from a poster through a communication line;
generate a presented image, the presented image being an image that is to be presented to the user and that is obtained by processing the shared image such that the image is different from the shared image that has been received, and such that additional information that is not included in the shared image is superimposed on the shared image,
wherein the additional information is identification information that is uniquely associated with the shared image and that is used, when being received, to provide an instruction to start specific processing on the shared image, the specific processing including outputting the shared image;
perform control to transmit the presented image to the poster through the communication line to notify the user of content of the shared image; and
perform control to transmit to the poster, together with the presented image, another presented image associated with another shared image that is different from the shared image posted by the poster and whose sharing period has not expired.

2. The control device according to claim 1, wherein the processor is further programmed to generate the presented image such that the shared image and the presented image are different from each other in displayed content.

3. The control device according to claim 2, wherein the processor is programmed to:
identify displayed content of the shared image; and
generate, as the presented image, an image that is obtained by processing the shared image such that the additional information is not superimposed on a specific region of the shared image whose displayed content has been identified by the processor.

4. The control device according to claim 2, wherein the processor is programmed to:
generate, as the presented image, an image that is obtained by decreasing a resolution of the shared image.

5. The control device according to claim 4, wherein the processor is programmed to:
generate the resolution of the shared image so that a capacity of the presented image becomes smaller than or equal to a predetermined capacity.

6. The control device according to claim 1, wherein the processor is programmed to:
perform control to transmit the presented image if the processor receives a request to transmit the presented image from the poster.

7. The control device according to claim 1, wherein if an instruction indicating that the presented image is not necessary is provided using necessity or nonnecessity information that indicates whether or not the presented image is necessary and that is received by the processor from the poster, the processor is programmed to:
  not generate the presented image; and
  perform control to not transmit the presented image to the poster through the communication line.

8. The control device according to claim 1, wherein if the presented image has a capacity larger than a capacity that is predetermined as an allowable upper limit value by the poster, the processor is programmed to:
  perform control to not transmit the presented image to the poster.

9. The control device according to claim 1, wherein if the processor receives the presented image that has been transmitted to the poster, the processor is programmed to:
  perform control to switch processing to be performed in accordance with a source of the presented image received by the processor.

10. The control device according to claim 9, wherein if the source of the presented image received by the processor is the poster, the processor is programmed to:
  generate a new expiration date by extending an expiration date indicating a sharing period of the shared image associated with the presented image received by the processor; and
  associate the new expiration date with the shared image associated with the presented image received by the processor.

11. The control device according to claim 9, wherein if the source of the presented image that has been received together with the shared image by the processor and that is associated with another shared image different from the shared image is the poster, the processor is programmed to:
  perform control to relate the received shared image with the other shared image and to determine, if the processor has received an instruction to start specific processing on one of the shared image and the other shared image and if sharing periods of the shared image and the other shared image have not expired, whether or not to perform the specific processing on another one of the shared image and the other shared image.

12. The control device according to claim 9, wherein if the source of the presented image received by the processor is different from the poster, the processor is programmed to:
  perform control to transmit, to the source of the presented image, the presented image associated with the shared image that has previously been posted by a poster of the shared image associated with the presented image received by the processor.

13. The control device according to claim 12, wherein the processor is programmed to:
  perform control to transmit, to the source of the presented image, the presented image associated with the shared image whose sharing period has not expired among shared images that have previously been posted by the poster of the shared image associated with the presented image received by the processor.

14. The control device according to claim 1, wherein if specific processing has been performed on the shared image posted by the poster, the processor is programmed to:
  perform control to transmit information about the specific processing to the poster.

15. The control device according to claim 14, wherein the specific processing includes processing of forming the shared image on a recording medium by an image forming device connected to the control device through the communication line, and
the information about the specific processing includes a total number of times the shared image is formed on the recording medium by the image forming device.

16. The control device according to claim 1, wherein the processor is programmed to:
  perform control to post the shared image received from the poster and the presented image including the additional information in a first virtual space; and
  perform control to post the presented image including the additional information to a second virtual space, the first virtual space being different from the second virtual space.

17. A non-transitory computer readable medium storing a control program causing a computer to execute a process, the process comprising:
  receiving a shared image to be shared with a user from a poster through a communication line;
  generating a presented image, the presented image being an image that is to be presented to the user and that is obtained by processing the shared image such that the image is different from the shared image that has been received, and such that additional information that is not included in the shared image is superimposed on the shared image,
  wherein the additional information is identification information that is uniquely associated with the shared image and that is used, when being received, to provide an instruction to start specific processing on the shared image, the specific processing including outputting the shared image;
  performing control to transmit the presented image to the poster through the communication line to notify the user of content of the shared image; and
  performing control to transmit to the poster, together with the presented image, another presented image associated with another shared image that is different from the shared image posted by the poster and whose sharing period has not expired.

18. A control device comprising:
  receiving means for receiving a shared image to be shared with a user from a poster through a communication line;
  generating means for generating a presented image, the presented image being an image that is to be presented to the user and that is obtained by processing the shared image such that the image is different from the shared image received by the receiving means, and such that additional information that is not included in the shared image is superimposed on the shared image,
  wherein the additional information is identification information that is uniquely associated with the shared image and that is used, when being received, to provide an instruction to start specific processing on the shared image, the specific processing including outputting the shared image;
  control means for performing control to transmit the presented image to the poster through the communication line to notify the user of content of the shared image; and
  control means for performing control to transmit to the poster, together with the presented image, another presented image associated with another shared image that is different from the shared image posted by the poster and whose sharing period has not expired.

* * * * *